United States Patent
Saers et al.

(10) Patent No.: US 11,518,396 B2
(45) Date of Patent: Dec. 6, 2022

(54) METHOD AND CONTROL UNIT FOR FACILITATING DIAGNOSIS FOR A VEHICLE

(71) Applicant: Scania CV AB, Södertälje (SE)

(72) Inventors: Alexander Saers, Hägersten (SE); Johan Aneros, Huddinge (SE); Henrik Felixson, Stockholm (SE); Simon Wretblad, Stockholm (SE); Carl Blumenthal, Nyköping (SE); Andreas Borg, Södertälje (SE)

(73) Assignee: Scania CV AB, Södertälje (SE)

( * ) Notice: Subject to any disclaimer, the term of this patent is extended or adjusted under 35 U.S.C. 154(b) by 227 days.

(21) Appl. No.: 16/957,353

(22) PCT Filed: Dec. 11, 2018

(86) PCT No.: PCT/SE2018/051275
§ 371 (c)(1),
(2) Date: Jun. 23, 2020

(87) PCT Pub. No.: WO2019/132749
PCT Pub. Date: Jul. 4, 2019

(65) Prior Publication Data
US 2020/0331483 A1 Oct. 22, 2020

(30) Foreign Application Priority Data
Dec. 27, 2017 (SE) .................... 1751648-5

(51) Int. Cl.
*G06F 13/38* (2006.01)
*B60W 50/02* (2012.01)
(Continued)

(52) U.S. Cl.
CPC ..... *B60W 50/0205* (2013.01); *B60R 16/0231* (2013.01); *G06F 8/65* (2013.01);
(Continued)

(58) Field of Classification Search
CPC ......... B60W 50/0205; B60W 2556/10; B60W 2556/45; B60W 50/02; B60R 16/0231;
(Continued)

(56) References Cited

U.S. PATENT DOCUMENTS 8,880,654 B2  11/2014  Zachos
9,513,789 B2  12/2016  Marshall et al.
(Continued)

FOREIGN PATENT DOCUMENTS

CN  103946681 A  7/2014
CN  106998351 A  8/2017
(Continued)

OTHER PUBLICATIONS

SCANIA CV AB, International Application No. PCT/SE2018/051275, International Search Report, dated Mar. 18, 2019.
(Continued)

*Primary Examiner* — Thai Nguyen
(74) *Attorney, Agent, or Firm* — Moore & Van Allen PLLC; W. Kevin Ransom

(57) ABSTRACT

Disclosed are methods and control units for facilitating diagnosis for a vehicle. The invention comprises: receiving configuration information related to a configuration of an add-on interface from a vehicle external communication unit, the add-on interface being arranged in the vehicle as an interface between a vehicle internal system and the add-on system; configuring the add-on interface based on the configuration information; creating, based on the configuration information, at least one diagnostic identifier related to the add-on system; and providing diagnostic information corresponding to the at least one diagnostic identifier to the vehicle external communication unit, thereby facilitating
(Continued)

diagnosis of the add-on system performed by at least one diagnosis tool associated with the external communication unit.

14 Claims, 5 Drawing Sheets

(51) Int. Cl.
| | |
|---|---|
| *B60R 16/023* | (2006.01) |
| *G06F 8/65* | (2018.01) |
| *G06F 9/445* | (2018.01) |
| *G07C 5/08* | (2006.01) |
| *H04L 12/40* | (2006.01) |
| *H04L 67/12* | (2022.01) |
| *H04L 67/00* | (2022.01) |

(52) U.S. Cl.
CPC ...... *G06F 9/44505* (2013.01); *G06F 9/44526* (2013.01); *G06F 13/38* (2013.01); *G07C 5/0808* (2013.01); *H04L 12/40* (2013.01); *H04L 67/12* (2013.01); *H04L 67/34* (2013.01); *B60W 2556/10* (2020.02); *B60W 2556/45* (2020.02); *H04L 2012/40273* (2013.01)

(58) Field of Classification Search
CPC .... G06F 8/65; G06F 9/44505; G06F 9/44526; G06F 13/38; G06F 9/541; G06F 9/451; G06F 11/3003; G06F 11/3058; G07C 5/0808; H04L 12/40; H04L 67/12; H04L 67/34; H04L 2012/40273; H04L 65/40; H04L 67/53; H04L 12/403; H04W 4/44; H04W 4/50; H04W 4/70
See application file for complete search history.

(56) References Cited

U.S. PATENT DOCUMENTS

| | | |
|---|---|---|
| 9,607,449 B1 | 3/2017 | Chen |
| 9,923,722 B2 | 3/2018 | Nanjundappa |
| 2002/0123833 A1 | 9/2002 | Sakurai et al. |
| 2007/0010922 A1* | 1/2007 | Buckley ................ G07C 5/008 701/2 |
| 2008/0021607 A1 | 1/2008 | Kato et al. |
| 2008/0065994 A1 | 3/2008 | Wang et al. |
| 2008/0247576 A1 | 10/2008 | Marlowe |
| 2008/0306645 A1 | 12/2008 | Dewhurst et al. |
| 2011/0046788 A1 | 2/2011 | Daly et al. |
| 2011/0276219 A1 | 11/2011 | Swaminathan et al. |
| 2013/0157647 A1 | 6/2013 | Kolodziej |
| 2013/0332844 A1 | 12/2013 | Rutledge |
| 2014/0288767 A1 | 9/2014 | Aneros et al. |
| 2014/0350749 A1 | 11/2014 | Kwak |
| 2016/0031389 A1 | 2/2016 | Grimm et al. |
| 2016/0070559 A1* | 3/2016 | West ........................ G06F 8/65 717/172 |
| 2016/0148442 A1 | 5/2016 | Kuemmel |
| 2017/0262301 A1 | 9/2017 | Bai et al. |

FOREIGN PATENT DOCUMENTS

| | | |
|---|---|---|
| CN | 107076981 A | 8/2017 |
| CN | 107306269 A | 10/2017 |
| EP | 1796051 A1 | 6/2007 |
| FR | 3013458 A1 | 5/2015 |
| WO | 2015100278 A1 | 7/2015 |
| WO | WO-2016007712 A1 * | 1/2016 ............ G07C 5/008 |
| WO | 2016147149 A1 | 9/2016 |

OTHER PUBLICATIONS

SCANIA CV AB, International Application No. PCT/SE2018/051275, Written Opinion, dated Mar. 18, 2019.
SCANIA CV AB, Swedish Application No. 1751648-5, Office Action, dated Sep. 14, 2018.
SCANIA CV AB, International Application No. PCT/SE2018/051275, International Preliminary Report on Patentability, dated Jun. 30, 2020.
SCANIA CV AB, Korean Patent Application No. 10-2020-7020588, Office Action, dated Jul. 28, 2021.
SCANIA CV AB, European Patent Application No. 18897063.6, Extended European Search Report, dated Aug. 18, 2021.
Scania CV AB, Chinese Patent Application No. 201880081612.4, First Office Action, dated Aug. 3, 2022.

* cited by examiner

METHOD AND CONTROL UNIT FOR FACILITATING DIAGNOSIS FOR A VEHICLE

CROSS-REFERENCE TO RELATED APPLICATIONS

This application is a national stage application (filed under 35 § U.S.C. 371) of PCT/SE2018/051275, filed Dec. 11, 2018 of the same title, which, in turn, claims priority to Swedish Application No 1751648-5 filed Dec. 27, 2017; the contents of each of which are hereby incorporated by reference.

FIELD OF THE INVENTION

The present invention relates to a method for facilitating diagnosis for a vehicle. The present invention also relates to at least one control unit arranged for facilitating diagnosis for a vehicle. The present invention also relates to a computer program and a computer-readable medium comprising instructions for carrying out the method according to the invention.

BACKGROUND OF THE INVENTION

The following background information is a description of the background of the present invention, which thus not necessarily has to be a description of prior art.

Vehicle manufacture may be conducted in a variety of ways. In for example the car industry, the manufacturer usually produces vehicles that are complete and intended for direct delivery to final customers.

The heavy vehicle industry, however, commonly also employs other kinds of production methods. Manufacturers of heavy vehicles may, as in the car industry, produce vehicles intended for delivery directly to final customers or final users of the vehicles. However, it is also common that heavy vehicles produced by the manufacturer are only partly manufactured, i.e. are only completed to a certain extent, including vehicle internal systems, in view of being subsequently completed by a party other than the manufacturer, for example a user or a customer of the manufacturer, e.g. a third-party supplier, in such a way as to meet specific requirements of the final customers or users.

It may also be that the vehicle, although substantially completed by its manufacturer, will be provided with further functionalities and/or systems, in this document denoted add-on systems, e.g. by another party such as a third-party supplier, a customer, or a final user, before it is put into use. It is for example usual that commercial vehicle manufacturers, as well as producing fully equipped vehicles, produce also vehicle versions being only partly manufactured, for example intentionally comprising only the chassis, or the chassis and the driver compartment/cab. The partially manufactured vehicle is then intended to be subsequently completed with one or more additional systems and/or functionalities by another party than the manufacturer, in accordance with the specific requirements of the another party, being e.g. a final customer and/or final user.

For example, chassis produced by a vehicle manufacturer may be designed to be usable in any desired way as bases for building on in order to construct mobile homes, fire vehicles, ambulances, concrete mixer trucks, refrigerated vehicles, or any other especially adapted vehicle. Also, for example a bus chassis may be produced by the vehicle manufacturer with little or no bodywork, with the intention to complete the vehicle with subsequent building-on performed by a bus bodybuilder. Generally, a bodybuilder installs/adds one or more add-on systems, i.e. does bodywork, on a vehicle after its original manufacture.

Thus, the building-on and/or addition of one or more systems and/or functionalities carried out by another party may be very extensive, and at least some building-on is also very common in the case of heavy vehicles. For this reason, the vehicle manufacturer often also prepares the vehicle in such a way as to facilitate subsequent building-on.

For example, one or more power takeoffs are often included in the vehicle by the manufacturer, e.g. so that add-on systems may be connected for example to the vehicle's engine and/or gearbox to enable them to be provided with driving power from the vehicle. There may also be connections to make it possible to use, for example, the vehicle's electrical system, hydraulic system and/or pneumatic system for implementation of add-on functions. A vehicle may thus be provided with a plurality of power takeoffs, and the power takeoff requirement may vary depending on the kinds of applications built onto the vehicle. Certain applications may for example require power which is constantly available when the engine of the vehicle is running, irrespective of whether the vehicle is moving or not, e.g. in the case of concrete mixer trucks, refrigeration units in refrigerated vehicles. Other applications may only need power on distinct occasions, e.g. upon activation of an additional system. The activation of a power takeoff for, and hence activation of the operation of, one or more built-on systems and/or functionalities is often not such that continuous or unregulated power takeoff is desirable, since it is only usually required in certain situations, e.g. upon a demand from the built-on systems and/or functionalities themselves or from, for example, the vehicle's driver.

SUMMARY OF THE INVENTION

The one or more add-on systems being implemented in the vehicle are often unknown for diagnostic support systems, including e.g. one or more diagnostic tools, used for diagnosis of the vehicle. The diagnostic tool may, for example, be provided by the manufacturer of the vehicle. The manufacturer cannot know which add-on systems will be added to the vehicle, and can obviously therefore not provide any specific diagnosis possibilities for the add-on systems. Since the add-on systems are unknown for the manufacturer, and are therefore also unknown for the diagnostic tool, the need for diagnostic services for the add-on systems is unknown for the diagnostic tool. Also, the diagnostic tool is also unaware of what signals are providable/possible to be outputted by the add-on systems.

Thus, it may be impossible to perform diagnosis for add-on systems using the diagnosis tool used for performing diagnosis on the rest of the vehicle, e.g. on the vehicle internal systems, since the need for diagnosis of the add-on systems and/or the features of the add-on systems themselves are generally unknown for the diagnosis tool.

It is therefore an object to solve at least some of the above-mentioned disadvantages.

The object is achieved by a method for facilitating diagnosis for a vehicle, the vehicle including:
  at least one vehicle internal system;
  at least one add-on system, the add-on system being arranged in the vehicle after the vehicle is produced by a manufacturer; and at least one internal communication unit arranged for communication with at least one vehicle external communication unit.

The method includes:

receiving, by usage of the at least one internal communication unit, configuration information related to a configuration of an add-on interface from the at least one vehicle external communication unit, the add-on interface being arranged in the vehicle as an interface between the at least one vehicle internal system and the at least one add-on system;

configuring the add-on interface based on the configuration information;

creating, based on the configuration information, at least one diagnostic identifier related to one or more of the at least one add-on system; and providing, by use of the at least one internal communication unit, diagnostic information corresponding to the at least one diagnostic identifier to one or more of the at least one vehicle external communication units, thereby facilitating diagnosis of the one or more of the at least one add-on system performed by at least one diagnosis tool associated with the at least one vehicle external communication unit.

Hereby, i.e. by the automatic creation of diagnostic identifiers related to the add-on interface configuration, and by the distribution of the diagnostic identifiers and/or the diagnostic information corresponding to the diagnostic identifiers via the internal and external communication units, the diagnosis equipment may use the diagnostic information to be able to provide a reliable diagnosis for all add-on systems, also for the add-on systems being initially and/or completely unknown for the diagnosis equipment. In this document, a diagnostic identifier is used as an identifier indicating, i.e. being related to, a diagnosis service for one or more add-on systems. The diagnostic identifier is created based on the configuration information used for configuring the add-on interface, which makes it possible to create such diagnostic identifiers for add-on systems being unknown for the diagnosis system. The diagnostic information is in this document the information corresponding/relating to this diagnostic service, e.g. the information being needed for performing the diagnosis in the diagnosis system. Thus, the diagnostic information corresponding to the diagnostic identifier may be identified by usage of the diagnostic identifier. A diagnosis may then be performed based on the thereby identified diagnostic information. Thus, a reliable and accurate generic diagnosis system is automatically provided by the embodiments of the present invention. The diagnosis may also be tailored, e.g. by a final user, a customer, and/or a manufacturer such that it is adapted to essentially any kind of vehicle systems, internal and/or add-on systems, being implemented in the vehicle. Hereby, a very flexible diagnosis is provided, which is easily adaptable to the needs and/or systems added by a final user and/or customer.

Thus, other parties than the manufacturer are provided with a diagnosis interface, which automatically allocates diagnostic identifiers to more or less unknown vehicle systems, such that the more or less unknown systems may be easily diagnosed, based on the diagnostic information being retrieved by usage of the diagnostic identifiers, just as any other vehicle system known for a manufacturer. In other words, by using the embodiments of the present invention, a standard/overall diagnosis tool provided by the manufacturer may be used for generic diagnosis of essentially any possible vehicle system implemented in the vehicle.

By way of embodiments of the present invention, the addition of an add-on system to the vehicle is facilitated.

According to an embodiment of the present invention, the add-on interface configuration information includes information related to one or more of:

information related to at least one functionality of the add-on interface;

information related to at least one signal used by one or more of the at least one add-on system; and information related to at least one signal used by one or more of the at least one vehicle internal system.

The diagnostic identifiers are thus created based on the functionality of the add-on systems and/or based on the signalling used by the vehicle systems. Hereby, a reliable and accurate diagnosis may be facilitated for essentially any internal and/or add-on systems being implemented in the vehicle, since the diagnostic information fetched/retrieved for the diagnosis is also related to the functionality of the add-on systems, and/or on the signaling of the add-on and/or vehicle internal systems.

According to an embodiment of the present invention, the wherein at least one signal used by the one or more of the at least one add-on system and/or by the one or more of the at least one vehicle internal system is one in the group of:

at least one controller area network (CAN) signal;
at least one bus signal;
at least one digital signal;
at least one analog signal;
at least one signal transferred by a wireless connection; and
at least one signal transferred by a wired connection Hereby, the diagnosis may be adapted to be useful for interpreting essentially any kind of signal provided by essentially any kind of internal and/or add-on systems.

According to an embodiment of the present invention, the configuring of the add-on interface is performed without involving the manufacturer of the vehicle. The configuration of the add-on interface is instead performed by updating/adjusting one or more parameter values, i.e. by a parameter update. Such a parameter update may be performed/initiated by a party other than the manufacturer, e.g. a customer and/or a final user, without risking that the important programming code is altered in a negative way. Thus, since the configuration of the add-on interface is achieved by parameter adaption/adjustment, the manufacturer can be certain that the programming code defining the add-on interface, which is often provided by the manufacturer, is intact/unaffected by the configuration. Also, an add-on interface update/configuration is hereby provided, which may be flexibly and easily performed e.g. by a final user, without having to take the vehicle to the manufacturer and/or to the workshop, which reduces both costs and vehicle off road time.

According to an embodiment of the present invention, the configuration information is received from one or more of:

a final user of the vehicle;
at least one party other than the manufacturer, the at least one other party having knowledge of the at least one add-on system; and
the manufacturer.

Thus, the add-on interface configuration, on which the diagnosis identifiers are based, may be provided/inputted by the party having knowledge of the system, e.g. an internal and/or an add-on system, for which diagnosis is to be facilitated.

According to an embodiment of the present invention, the creating of the at least one diagnostic identifier is based also on additional diagnostic information received from one or more of:
- a final user of the vehicle;
- at least one party other than the manufacturer, the at least one other party having knowledge of the at least one add-on system; and
- the manufacturer Hereby, the diagnostic identifiers may be created based also on additional diagnostic information being specific for the diagnosis, in addition to being based on the add-on interface configuration information. For example, the additional information related to the diagnosis may include system specific information for the internal and/or add-on systems, which does not necessarily has to be related to the configuration of the add-on interface, for example if the diagnosis should be made based on values, signals or the like that are not used by the vehicle itself, e.g. is not used by the at least one vehicle internal system. Thus, internal values, signals or the like of the add-on systems may hereby be used as basis for the diagnosis, which may help e.g. a bodybuilder to find internal errors in their own add-on systems. As a non-limiting example, if an add-on system, such as e.g. a crane, has various statuses for a signal depending on different errors, the additional diagnostic information may include signal statuses and descriptions related to the errors, respectively. The signal statuses related to the errors and the descriptions related to the errors may then be presented in a logic program specifically designed for diagnosis of the crane, and possibly for a specific crane function.

According to an embodiment of the present invention, the at least one vehicle external communication unit is included in and/or is associated with one or more of:
- a diagnostic tool arranged for performing one or more diagnostic operations on vehicle by usage of the diagnostic information corresponding to the at least one diagnostic identifier; and
- a register storing the at least one diagnostic identifier and/or the diagnostic information.

Hereby, the diagnostic identifiers and/or the diagnostic information may directly and/or indirectly, i.e. via the register, be provided to the diagnostic tool, since they are transferred from the internal to the external communication unit, and since the external communication unit is either included in and/or is associated with, e.g. connected/coupled to, the diagnostic tool and/or to the register. The diagnostic tool may therefore use these diagnostic identifiers and/or the diagnostic information when performing the diagnosis.

The object is also achieved by the above mentioned at least one control unit arranged for for facilitating diagnosis for a vehicle including:
- at least one vehicle internal system;
- at least one add-on system arranged in the vehicle after the vehicle is produced by a manufacturer; and
- at least one internal communication unit arranged for communication with at least one vehicle external communication unit.

The at least one control unit is configured for:
- receiving, by usage of the at least one internal communication unit, configuration information related to a configuration of an add-on interface from the at least one vehicle external communication unit, the add-on interface being arranged in the vehicle as an interface between the at least one vehicle internal system and the at least one add-on system;
- configuring the add-on interface based on the configuration information;
- creating, based on the configuration information, at least one diagnostic identifier related to one or more of the at least one add-on system; and
- providing, by use of the at least one internal communication unit, diagnostic information corresponding to the at least one diagnostic identifier to one or more of the at least one vehicle external communication units, thereby facilitating diagnosis of the one or more of the at least one add-on system performed by at least one diagnosis tool associated with the at least one vehicle external communication unit.

The at least one control unit has advantages corresponding to the above-mentioned advantages for the method.

The object is also achieved by the above-mentioned computer program and computer-readable medium.

Detailed exemplary embodiments and advantages of the method, control system, computer program and computer-readable medium according to the invention will below be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF THE INVENTION

Figure 1:
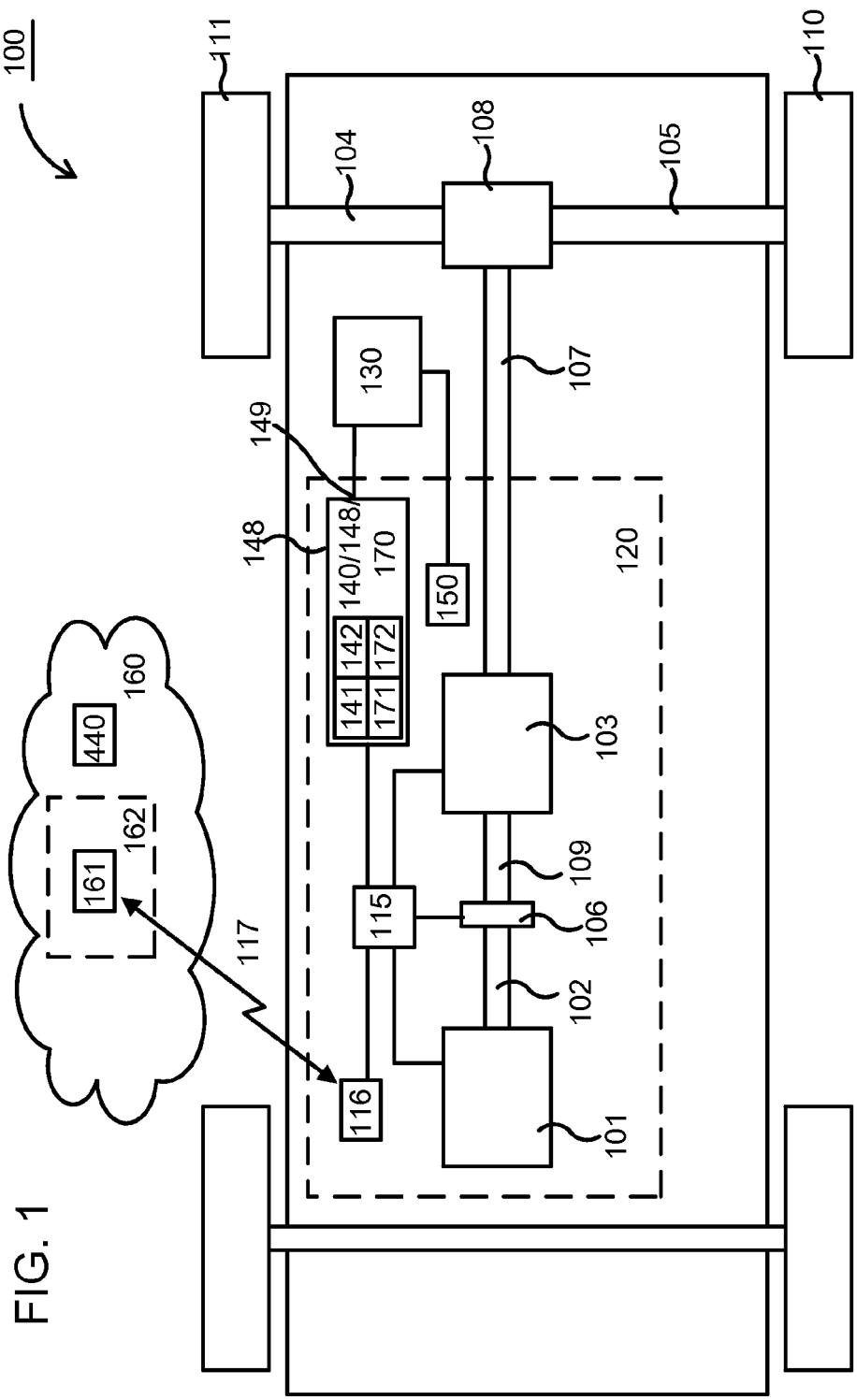
FIG. 1 is a schematic illustration of a non-limiting example of a vehicle in which the embodiments of the present invention may be implemented.

FIG. 1 schematically illustrates a power train in a vehicle 100, in which the embodiments of the present invention may be implemented. The illustrated vehicle 100 has only one axle 104, 105 with tractive/drive wheels 110, 111, but the invention is also applicable to vehicles which have more than one axle provided with tractive wheels. The power train comprises a combustion engine 101 which in a conventional way, via an output shaft 102 of the engine, usually via a flywheel, is connected to a gearbox 103 via a clutch 106 and an input shaft 109 connected to the gearbox 103.

The engine may be controlled by the vehicle's control system via a control unit 115. The clutch 106, which may for example take the form of an automatically controlled clutch, and/or the gearbox 103, which may for example be a conventional automatic gearbox, may also be controlled by means of one or more suitable control units, generally depicted as the control unit 115 in FIG. 1. Thus, the function of the control unit 115 may be provided by two or more control units, as is mentioned more in detail below.

The vehicle 100 may further include at least one internal communication unit 116, being associated/connected to one or more control units 115 of the vehicle. For example, the at least one internal communication unit 116 may be included in a control system network of the vehicle 100. The control system network may, as is described below, essentially include any suitable communication interface facilitating communication between control units/devices/entities in the vehicle 100. For example, the communication interface connects the one or more vehicle internal systems 120 with each other, including connecting the at least one internal communication unit 116 with the control unit 115 and other internal systems 120 of the vehicle 100. Such a communication interface many for example, include a controller area network (CAN), an Ethernet connection, a Flexray bus, a local interconnect network (LIN) bus and/or a WiFi connection.

The at least one internal communication unit 116 is arranged for communication with at least one vehicle external communication unit 161, i.e. arranged for transmitting information to and/or receiving information from the at least one vehicle external communication unit 161. The at least one vehicle external communication unit 161 is arranged outside of the vehicle 100, and may be included in and/or associated/connected to essentially any suitable external device/node/apparatus/entity 162, such as e.g. at least one web and/or internet related unit, at least one internet cloud 160 related unit, at least one infrastructure unit, at least one external communication entity included in at least one other vehicle, at least one server and/or at least one database. The at least one vehicle external communication unit 161 may also be included in and/or associated/connected to essentially one or more of the units/devices/entities 411, 412, 413, 141, 420, 430, 440 of an add-on/bodybuilder network 410, as is described more in detail below.

The communication between the at least one internal 116 and at least one vehicle external communication unit 161 may be performed by usage of a wireless connection 117, e.g. a connection working according to essentially any suitable wireless standard, specification and/or protocol, such as according to the Global System for Mobile communications (GSM) standard, the General Packet Radio Service (GPRS) standard, the Bluetooth standard, any suitable wireless local area networking (WiFi) standard, any suitable generation of a broadband cellular technology (3G, LTE, 4G, 5G) standard, and/or any other suitable wireless standard. Alternatively, the connection 117 may also be a wired connection, including usage of at least one cable or other wiring equipment.

As illustrated in FIG. 1, an output shaft 107 from the gearbox 103 drives the tractive wheels 110, 111 via a final gear 108, e.g. a conventional differential, and driveshafts 104, 105 which are connected to said final gear.

The engine 101, the clutch 106 and the gearbox 103 may be examples of vehicle internal systems 120. As is understood by a skilled person, the vehicle may include a large number of such vehicle internal systems 120, i.e. systems arranged in the vehicle 100 when it was produced by the manufacturer.

In this document, parts, systems and/or functionalities being included/arranged in the vehicle already at vehicle manufacture/production by the manufacturer is commonly denoted vehicle internal system 120. Correspondingly, parts, systems and/or functionalities being included/arranged in the vehicle after the manufacture/production by the manufacturer is commonly denoted add-on systems 130 in this document. The manufacturer is in this document defined as a producer of the original/initial vehicle, being partly completed with at least one vehicle internal system 120 but lacking the later added at least one add-on system 130. The manufacturer of the partly completed vehicle may also be denoted as original equipment manufacturer (OEM). The one or more add-on systems 130 may be provided by another party, which in this document means a party which may be another and/or independent of the vehicle manufacturer, and to which a vehicle produced by the vehicle manufacturer is directly or indirectly delivered after being manufactured/produced. Thus, the other party may be a customer or a final user, but may also be a third-party supplier, which carries out building-on, i.e. addition of one or more add-on systems 130, before delivery to a final customer.

It should be noted that the vehicle depicted in FIG. 1 is merely one example of how the vehicle might be configured, as the embodiments of the invention are applicable to all types of vehicles, e.g. those with hybrid power trains, electric vehicles and/or other kinds of axle configurations, other types of gearboxes with or without clutches etc.

The one or more add-on systems 130 illustrated in FIG. 1 may be provided with power form one or more takeoffs 150, which may be situated at various locations in the vehicle 100.

The one or more add-on systems 130 may be of various kinds, e.g. one might comprise activation of a crane function via a power takeoff, whereas another might comprise illumination of a certain warning lamp at the vehicle driver's location. Thus, the one or more add-on systems 130 may be of a simple kind, i.e. have a low complexity, but may also have substantially any desired functionality, and thus also any complexity.

The one or more add-on systems 130 may need, i.e. may have a demand for, power to be provided to the add-on systems 130. The one or more add-on systems 130 may also need, i.e. may have a demand for, being able to communicate with an internal control system of the vehicle, in order to be provided with one or more signals, parameters and/or control signals available in the internal control system, and/or to be able to provide one or more signals, parameters and/or control signals to the one or more vehicle internal systems 120 via the vehicle internal control system. The one or more add-on systems 130 may also need, i.e. may have a demand for, being able to communicate with one or more nodes/devices/entities/equipment external from the vehicle.

Power needed by the one or more add-on systems 130 may e.g. be provided by the above mentioned one or more power takeoffs 150 and/or may be provided by an add-on interface 140 arranged for providing communication between the one or more vehicle internal systems 120 and the one or more add-on systems 130. The communication between the one or more vehicle internal systems 120 and the one or more add-on systems 130 is facilitated by the add-on interface 140. Thus, the add-on interface communicates one or more signals, parameters and/or control signals between the one or more vehicle internal systems 120 and the one or more add-on systems 130. Thus, the add-on interface 140 is provided as a general interface between said at least one vehicle internal system 120 and said at least one add-on system 130. The add-on interface includes one or more inputs/outputs, for example input/output pins, to which systems, such as e.g. add-on systems, may be connected. Via these inputs/outputs, signals are received/transmitted to the systems connected to the add-on interface 140. For example, the one or more add-on systems may be connected to one or more inputs of the add-on interface, and may provide signals of any suitable signaling format, which is often related to the specific add-on system providing the signal, to the one or more inputs. Essentially, any signaling format mentioned in this document may be received at the one or more inputs.

Correspondingly, signals may also be output on the one or more outputs of the add-on interface 140, on a suitable signaling format.

As mentioned above, the at least one internal communication unit 116, and also other vehicle internal system 120, may be included in a control system network of the vehicle 100, which may include the above-mentioned communication interface connecting the one or more vehicle internal systems 120 with each other. Such a communication interface many for example, include a controller area network (CAN), an Ethernet connection, a Flexray bus, a local interconnect network (LIN) bus and/or a WiFi connection. Such a communication interface may be generally used for connecting units/devices/entities/interfaces in the vehicle 100, such as connecting the add-on systems 130 to the add-on interface 140. The at least one add-on system 130 may be connected to an external control system network input, e.g. an external controller area network (CAN) input 149, of an interface/control unit 148 including the add-on interface 140. Hereby, a connection between the one or more add-on systems 130 and the communication interface, such as e.g. the controller area network (CAN), is provided, which is used for connecting the one or more add-on systems 130 to the one or more vehicle internal systems 120, via the communication interface, e.g. via the controller area network (CAN).

Thus, the one or more add-on systems 130 may use/need various information to be provided to them, from within the vehicle and/or from outside of the vehicle, and may therefore have a demand for communication abilities. The one or more add-on systems 130 may also demand resources from the vehicle, such as e.g. status signals from the vehicle, i.e. the signal state of appropriate outputs of the interface/control unit 148 including/implementing the add-on interface 140. The resources which the one or more add-on systems demand for their functions may for example take the form of a demand for mechanical power, electric power, hydraulic power and/or pneumatic power, and/or may take the form of a demand for at least one signal and/or at least one function of the control system of the vehicle. Normally, a demanded power, requiring activation of a power takeoff 150 has to be demanded from the internal control system of the vehicle 100. Where resources are demanded, they are often not constantly demanded, and are also often not constantly available.

Vehicle manufacturers are reluctant for some other party, e.g. a third-party supplier, to effect changes directly in the internal control system of the vehicle, since this may affect the performance of the vehicle in ways which are both undesirable and difficult to predict. This is also why the vehicle manufacturer provides the add-on interface 140, i.e. a signaling interface which can be used for an add-on system for communication with the internal control system of the vehicle.

The add-on interface 140 may be of various kinds, and may include a number of inputs and outputs, which each may have a certain function assigned to it. One output might for example represent activation of a vehicle internal system 120, e.g. a parking brake activation, and when the parking brake is applied this output might for example be set to a high level, in order thereby to communicate the activation of the internal system, e.g. the parking brake, to the one or more add-on systems 130. As is understood by a skilled person, a large number of other examples of functions, whose status may be signaled in a similar way, may be provided by the add-on interface 140. These signals may then be used by the one or more add-on systems 130, but subject for example to various conditions which usually have to be fulfilled for a certain function to be activated.

Thus, by the add-on interface 140, the vehicle manufacturer may provide a building-on interface to enable communication between the internal systems 120 and the add-on system 130. The add-on interface 140 may for example comprise one or more terminal blocks having a number of inputs/outputs, such that high/low/numerical signals on an output may for example represent a status of a certain function, and this information may be used as a control signal for conditional control of add-on system functions. There may also be inputs, e.g. for conveying from the add-on systems 130 signaling, e.g. such that inputting a high signal level on a certain input indicates a demand for activation of a function having a defined meaning.

As a given chassis configuration may be used for add-on systems within a large number of areas of application, it is often not possible at vehicle manufacturing stage to know the specific intended use of a specific chassis, still less the characteristics of specific add-on systems 130. Thus, the add-on systems may communicate their status, e.g. whether the function is active or inactive, by applying a voltage to an input on the add-on interface 140, which will be communicated further to the internal control system and/or vehicle internal systems 120 by the add-on interface 140. The internal communication system and/or the vehicle internal systems 120 will thus also be aware that add-on systems 130 exist and their status.

Control systems in modern vehicles usually comprise a communication bus system comprising of one or more communication buses arranged for connecting together a number of electronic control units (ECUs), e.g. the control units, or controllers, and various systems/components/devices on board the vehicle. Such a control system may comprise a large number of control units and the responsibility for a specific function may be spread over more than one of them.

For sake of simplicity, FIG. 1 shows only some such control units 115, 140. However, parts of the present invention may be implemented in any suitable control unit, e.g. the control units 115, 140, or wholly or partly in one or more other control units on board the vehicle 100. Control units of the kind depicted are normally adapted to receiving sensor signals from various parts and/or control units of the vehicle. Control units are also usually adapted to delivering control signals to various parts and components of the vehicle, e.g. the control units 115, 140 may deliver signals to suitable actuators for activation of power takeoffs and/or for activation of other vehicle internal systems 120.

The control unit 115 is in FIG. 1 schematically illustrated as receiving signals and/or providing control signals from and/or to the engine 101, the clutch 106 and/or the gearbox 103. The control system 120 may, also receive and/or provide control signals to and/or from other internal systems/devices 120 in the vehicle 100.

According to some embodiments of the present invention, as described in this document, the interface control unit 148 including the add-on interface 140 may comprise receiving means 141 arranged for receiving configuration information, e.g. a first receiving unit 141, configuration means 142 arranged for configuring the add-on interface, e.g. a second configuration unit 142. Also, an identifier control unit may comprise creation means 171 arranged for creating diagnostic identifiers, e.g. a creation unit 171, and a providing means 172, e.g. a providing unit 172. These control means/units/devices 141, 142, 171, 172, are described more in detail below, and may be divided physically into more entities than the herein described interface control unit 140 and identifier control unit 170, or may be arranged in less entities than herein described, e.g. in one entity.

Figure 2:
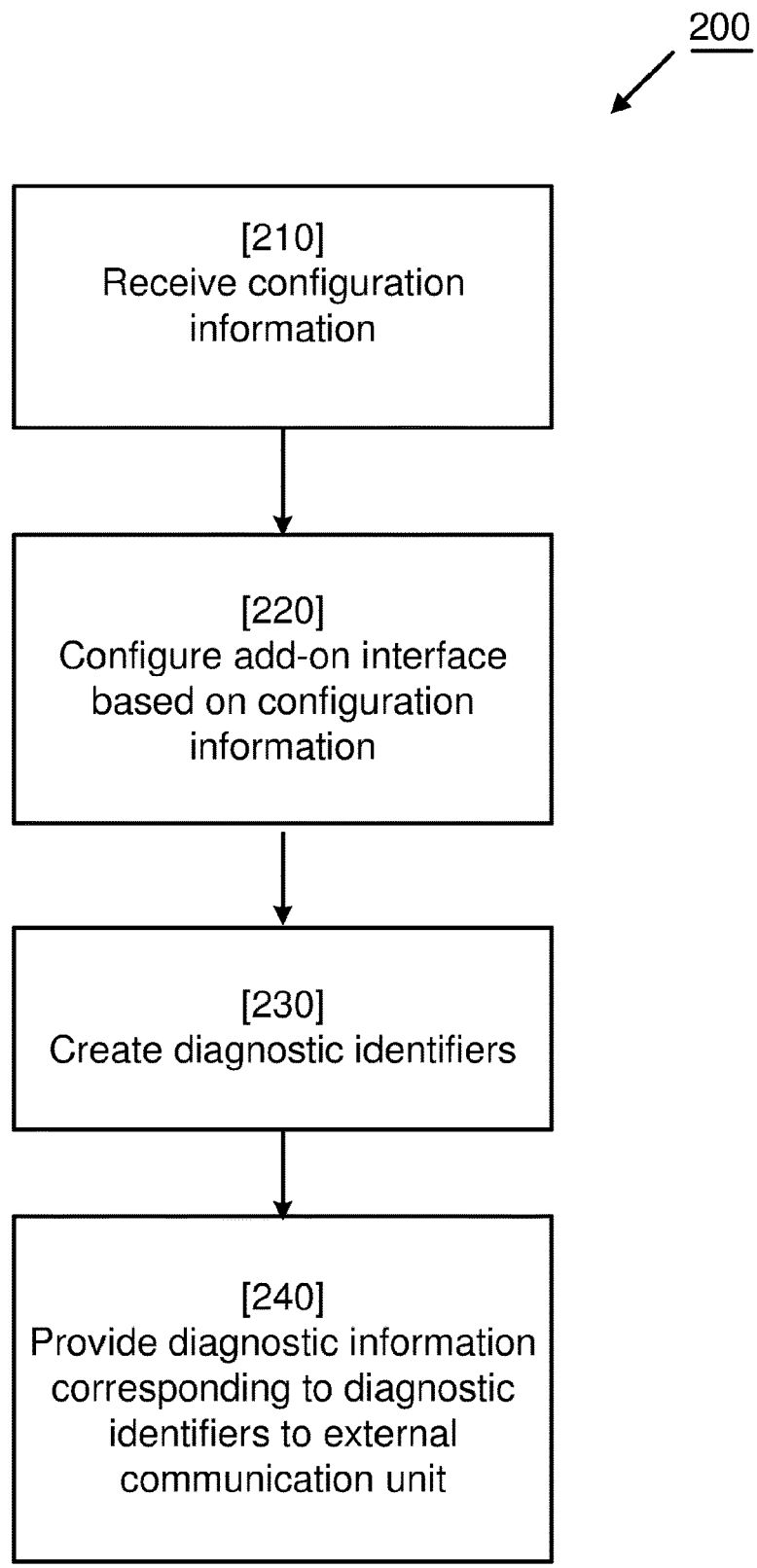
FIG. 2 shows a flow chart diagram for some embodiments of the present invention, FIG. 3 schematically illustrates an example of a diagnosis system implementing some embodiments of the present invention, FIG. 4 schematically illustrates a non-limiting example of a system, in which embodiments of the present invention may be implemented.

FIG. 2 shows a flow chart diagram for a method 200 according to an embodiment of the present invention, i.e. a method for facilitating diagnosis for a vehicle. The method steps of FIG. 2 may be performed in another order than illustrated in FIG. 2, as long as the information needed for performing a method step is available when the step is to be performed.

As described in this document, the vehicle 100 includes at least one vehicle internal system 120, at least one add-on system 130 being arranged in the vehicle 100 after the vehicle is produced by a manufacturer, and at least one internal communication unit 116 arranged for communicating with at least one vehicle external communication unit 161.

In a first step 210 of the method according to the present invention, configuration information related to a configuration of an add-on interface 140 is received by usage of the at least one internal communication unit 116. The configuration information is provided by at least one vehicle external communication unit 161 to the at least one internal communication unit 116. As is described in detail in this document, the add-on interface 140 is arranged in the vehicle 100 as an interface between the at least one vehicle internal system 120 and the at least one add-on system 130. The first step 210 may be performed e.g. by use of a below described receiving unit/means 141.

In a second step 220 of the method according to the present invention, the add-on interface 140 is configured based on the configuration information received in the first step 210. The configuration of the second step 220 may be performed e.g. by use of a below described configuration unit/means 142. The configuration of the add-on interface generally defines a link/coupling/connection/relation between more or less, i.e. partially or completely, unknown features and/or signals of one or more add-on systems and the control system network used in the vehicle, e.g. the vehicle internal systems.

In a third step 230 of the method according to the present invention, at least one diagnostic identifier related to one or more of the at least one add-on system 130 is created based on the configuration information received in the first step 210. The creation of the at least one diagnostic identifier may be performed e.g. by use of a below described creation unit/means 171. The diagnostic identifiers may be of essentially any kind useful for identifying/indicating one or more parameter settings/values related to the diagnosis, such as e.g. a keyword protocol (KWP) ID, a unified diagnosis signal (UDS), or some other kind of identifier and/or indicator. The diagnostic identifiers are related to information which may be useful for performing diagnosis of the at least one add-on system. Such information is in this document denoted diagnostic information.

In a fourth step 240 of the method according to the present invention, diagnostic information corresponding/related to the at least one diagnostic identifier is provided to one or more of the at least one vehicle external communication units 161 by use of the at least one internal communication unit 116. The at least one vehicle external communication unit 161 and the at least one internal communication unit 116 communicate with each other, such that the diagnostic information related to the at least one diagnostic identifier is transferred/transmitted to the at least one vehicle external communication unit 161. The providing of the diagnostic information may be performed by use of a below described providing unit/means 172. As mentioned below, the at least one vehicle external communication unit 161 may be associated with the diagnosis tool 440. Thus, the diagnostic information being provided/transmitted/transferred to the at least one vehicle external communication unit 161 facilitates diagnosis of the one or more of the at least one add-on system performed by the at least one diagnosis tool 440 associated with the at least one vehicle external communication units 161. In other words, the diagnostic information, having been found/retrieved/provided by use of the at least one diagnostic identifier, is by the diagnosis tool 440 used for performing the diagnosis of the at least one add-on system. Thus, since the add-on interface 140 is configured to match the at least one add-on system 130, the diagnostic identifiers that are created based on this configuration, are also related/matched to the at least one add-on system. The diagnostic identifiers may therefore be used for retrieving the diagnostic information needed for performing the diagnosis.

The diagnostic identifiers are related to, and are created based on, the actual configuration of the at least one add-on system. The diagnostic identifiers may therefore also be used for indicating the diagnosis needs and/or the features of the at least one add-on system, i.e. for identifying diagnostic information useful for performing the diagnosis. For example, the add-on interface 140 is typically configured such that it should be able to communicate with the at least one add-on system 130, wherefore signals provided by the at least one add-on system 130 are configured/defined in the add-on interface 140. Therefore, the configuration information used for configuring the add-on interface 140 includes information related to such signals from the at least one add-on system 130. Some of this signal information may typically be utilized when creating the diagnostic identifiers, and may therefore also be retrieved as diagnostic information. When the diagnostic information is provided to the diagnosis tool, the diagnosis tool will be able to interpret the signals provided by the at least one add-on system 130, and will therefore also be able to perform diagnostic actions/operations based on those signals.

In this way, by creation, distribution and utilization of the diagnostic identifiers and the corresponding/related diagnostic information, the add-on systems, initially being unknown for the diagnostic tool, may be included in the general vehicle diagnosis. Thus, a generic diagnosis system/tool is provided by this usage of the diagnosis identifiers and of the diagnosis information, where the generic diagnosis system/tool is generally usable for both vehicle internal systems and add-on systems.

The generic diagnosis possibilities provided by the herein presented embodiments may be achieved with very little addition to the vehicle complexity, and with essentially no addition of hardware.

Figure 3:
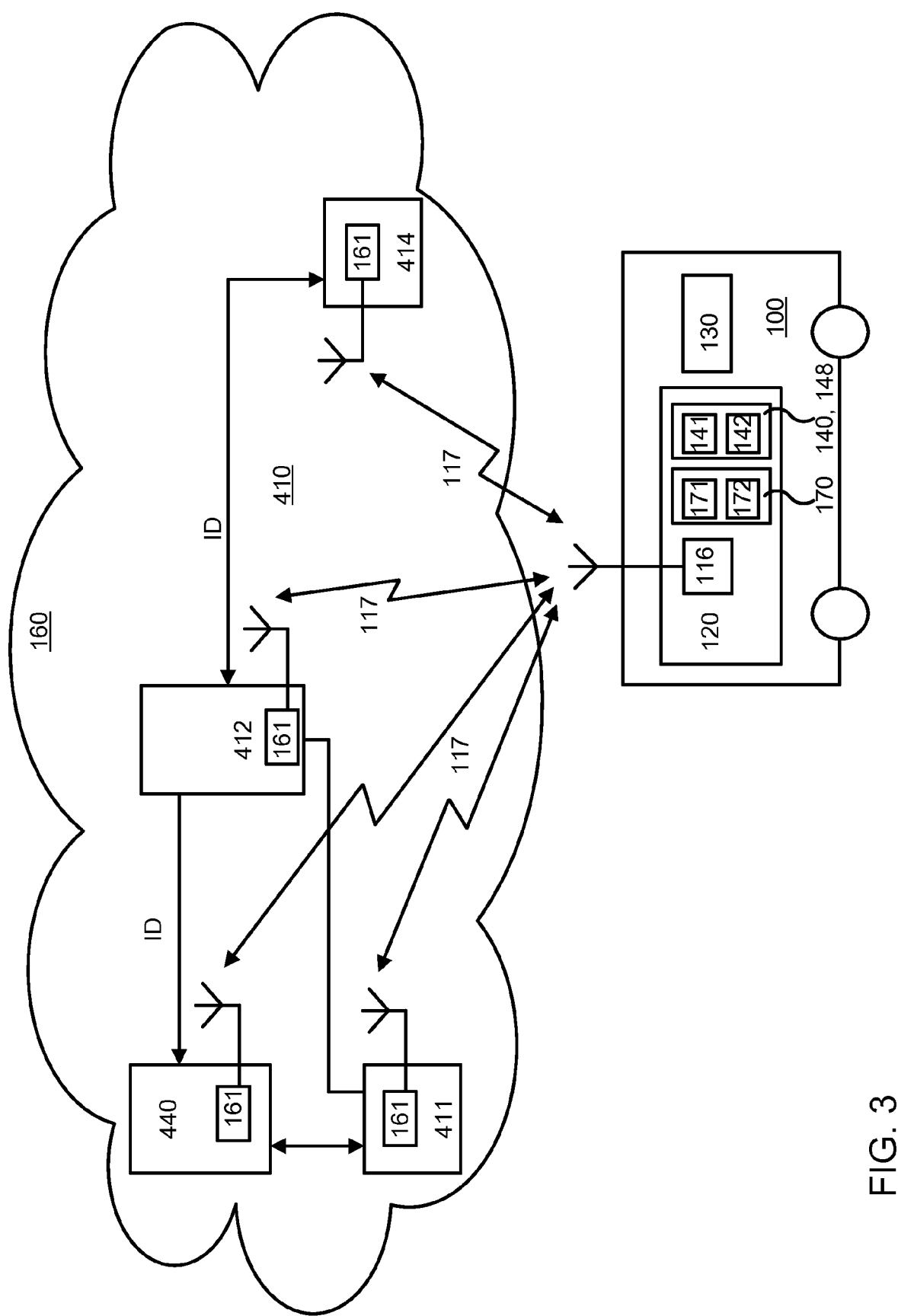

FIG. 3 schematically illustrates some parts of a diagnosis system for a vehicle 100 including one or more add-on systems 130. FIG. 3 only illustrate the parts of the diagnosis system which may be used for explaining the principles of the embodiments of the present invention. As is understood by a skilled person, the system may include other and/or more parts than those shown in FIG. 3. Also, the devices/nodes/units/entities shown in FIG. 3 may of course be implemented in a large variety of ways, of which FIG. 3 only illustrates one example.

A vehicle 100, as described in more detail in this document, comprises one or more vehicle internal systems 120, including at least one internal communication unit 116 and an interface/control unit 148 including an add-on interface 140. The vehicle 100 further comprises one or more add-on systems 130, connected to the one or more vehicle internal systems 120 via the add-on interface 140. The at least one internal communication unit 116 may communicate with at least one external communication unit 161, which may be located essentially anywhere outside of the vehicle, e.g. in a communication node 411, in the register 412 and/or in an add-on interface configuration tool 414, as described more in detail below. An identifier control unit 170 may also be included in the vehicle 100.

According to an embodiment of the present invention, at least one signal used by the at least one add-on system 130 and/or by the at least one vehicle internal system 120 is any suitable signal arranged for carrying/transferring any kind of information, and may include for example at least one controller area network (CAN) signal, at least one bus signal, at least one digital signal, at least one analog signal, at least one signal transferred by a wireless connection, and/or at least one signal transferred by a wired connection.

The add-on interface 140 may be configured, based on the configuration information, e.g. such that it is able to interpret the signals/information being input to it from the one or more add-on systems 130.

The configuration information, used for configuring the add-on interface 140, may include information related at least one functionality of the add-on interface 140, information related to at least one signal used by one or more of the at least one add-on system 130, and/or information related to at least one signal used by one or more of the at least one vehicle internal system 120. Generally, the configuration information may include essentially any information related to how the add-on interface 140 itself should work and/or how signals available in the vehicle 100 should be interpreted. This configuration is utilized by the embodiments of the present invention for creating the diagnostic identifiers used by the diagnostic tool 440.

An add-on network 410, external from the vehicle 100 may include an add-on interface configuration tool 414. By use of the add-on interface configuration tool 414, the add-on interface 140 may easily be configured and/or defined, as is described in this document. The configuration information, which is related to how the add-on interface 140 should be configured/defined, may be provided to and received by the add-on interface 140/148 e.g. from the add-on interface configuration tool 414. The add-on interface 140 may, according to an embodiment, be configured 220 by a parameter update, i.e. by altering/updating one or more parameter values related to the add-on interface, without update of a programming code defining the add-on interface 140, i.e. without involving the manufacturer of said vehicle 100. In other words, the add-on interface 140 may be updated without having to install a new version of the add-on interface software, simply by updating one or more parameter values, which may be performed by a final user of the vehicle 100, by the manufacturer of the vehicle, and/or by at least one party other than the manufacturer. In other words, the configuration information may be provided by a final user of the vehicle 100, by the manufacturer of the vehicle, and/or by at least one party other than the manufacturer.

According to an embodiment of the present invention, the at least one diagnostic identifier is based both on additional diagnostic information related to the diagnosis and on the add-on interface configuration information. The additional information related to the diagnosis may here e.g. be provided by a final user of the vehicle 100, by the manufacturer, by at least one party other than the manufacturer, which has knowledge of, e.g. has provided, the at least one add-on system 130. Hereby, for example the customer/user of the vehicle may influence/adjust the creation of the diagnostic identifiers, such that the diagnostic identifiers and the retrieved/provided diagnostic information, and thus also the performed diagnosis, may be tailored for the needs of the customer/user.

As described herein, the configuration information and/or the additional diagnostic information used for creating the diagnostic identifiers, may be provided to the vehicle by transmission from the at least one external communication unit 161 to the at least one internal communication unit 116. The at least one vehicle external communication unit 161 may be included in and/or may be associated with, e.g. may be connected to and/or communicating with, the diagnostic tool 440 arranged for performing one or more diagnostic operations on the vehicle 100 by usage of the diagnostic information and/or the at least one diagnostic identifier, as described herein. The at least one vehicle external communication unit 161 may also be included in and/or may be associated with the above-mentioned register 412 arranged for storing/including diagnostic identifiers.

The add-on/bodybuilder network 410 may be arranged essentially in any form external/outside of the vehicle 100, e.g. in an internet cloud 160 configuration.

One or more diagnosis equipment 440 may be arranged in the add-on network 410 to process diagnosis related information. According to various embodiments of the present invention, diagnostic identifiers are created based on, and assigned to, the specific configuration of the add-on interface 140. The diagnostic identifiers are then used for providing diagnostic information to, i.e. are used for retrieving/fetching/determining the diagnostic information, and for transmitting the diagnostic information to the at least one external communication unit 161 from the at least one internal communication unit 116.

The at least one external communication unit 161 may be included in the diagnostic tool 440 and/or in the register 412, as illustrated in FIG. 3. The at least one external communication unit 161 may also be associated with the diagnostic tool 440 and/or with the register 412, by being included in a node, such as e.g. in the communication node 411 and/or the add-on interface configuration tool 414, that are connected to and/or are arranged for communicating with the diagnostic tool 440 and/or the register 412.

The diagnostic information and/or the diagnostic identifiers may be stored in the register 412, and may therefrom be provided to the one or more nodes in need of them. Typically, the diagnostic information and/or the diagnostic identifiers are stored in the register 412 and are provided to the diagnosis tool 440 via a connection, whereby the diagnosis tool 440 may be able to perform reliable and accurate diagnosis operations on the one or more add-on systems 130, being initially unknown for the diagnosis tool 440.

Figure 4:
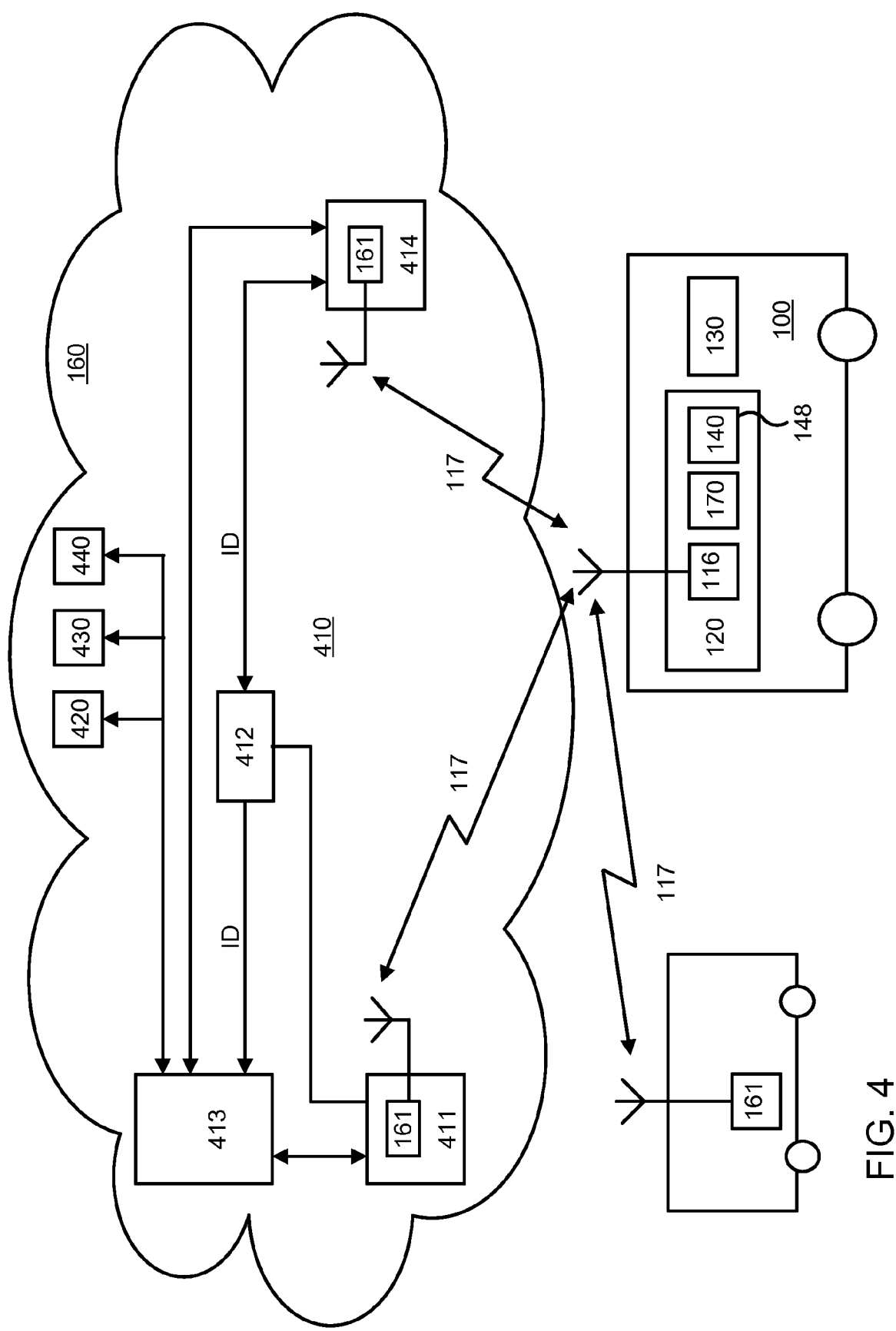

FIG. 4 schematically illustrates a system facilitating a general platform for handling vehicles including one or more add-on systems 130. As is understood by a skilled person, FIG. 4 for pedagogical reasons only shows some of the units/devices/entities/nodes in such a system. Essentially, only the units/devices/entities/nodes useful for explaining the concept are schematically illustrated in FIG. 4.

A vehicle 100, as the one described in this document, includes one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located essentially anywhere outside of the vehicle, e.g. in another vehicle and/or in one or more nodes 411, 412, 413, 414, 420, 430, 440 of an add-on/bodybuilder network 410. The one or more nodes 411, 412, 413, 414, 420, 430, 440 of the add-on/bodybuilder network 410 may be located e.g. in a web/internet/cloud related unit, in an infrastructure unit, in a server and/or in a database, as mentioned above. Generally, the add-on/bodybuilder network 410 may be implemented as an internet cloud 160 related solution. Generally, the one or more nodes 411, 412, 413, 414, 420, 430, 440 of an add-on/bodybuilder network 410 are in FIG. 4 for pedagogic reasons illustrated as separate nodes. However, these nodes may be implemented less nodes than illustrated in FIG. 4.

The add-on interface 140 utilized for the embodiments of the present invention may be an advanced and flexible interface provided with advanced logical functionality and possibilities for flexible definition of interface inputs and/or outputs. According to an embodiment, the logical functionality providable by the add-on interface 140 includes essentially any useful logical, numerical and/or mathematical operations, that may be operated on one or more signals input to the add-on interface 140. The input signals may here, according to various embodiments, include essentially any kind of signal, such as digital and/or analog signals, comprising well defined signal value levels and/or numerical signal values. Thus, the add-on interface 140 used by the embodiments of the present invention may be considerably more advanced than conventional add-on interfaces are, including e.g. processing of numerical signals, representation of physical values as numerical values, and/or performing numerical operations on the numerical values/signals.

The add-on interface 140 may also easily be configured such that it is able to interpret the signals/information being input to it from the one or more add-on systems 130, e.g. via an external control system network input, such as an external controller area network (CAN) input, of the interface/control unit 148 including the add-on interface 140. The add-on interface 140 may also easily be configured to output signals/information to the one or more add-on systems 130, via the external controller area network (CAN), such that the signals/information may be interpreted/used by the add-on systems 130. The add-on interface 140 may be arranged for converting signaling/information formats being used by the one or more add-on systems 130 to signaling/information formats being used by the one or more vehicle internal systems 120, and vice versa. Hereby, the one or more add-on systems 130 may communicate with the one or more vehicle internal systems 120, and possibly also with other systems, such as systems related to, or being included in the add-on/bodybuilder network 410.

Further, the add-on interface 140 may also be easily configured for interpreting sensor signals being provided by the one or more add-on systems 130, such that a flexibility regarding addition of sensors is achieved for the vehicle. Essentially, any type of sensor, providing any type of sensor signal having essentially any features, e.g. indicating any type of physical quantity unit, may be implemented in the one or more add-on systems 130, whereby the add-on interface 140 is configured to process the provided sensor signal accordingly. The add-on interface 140 may also be easily configured to output a processed sensor signal having suitable features to the one or more vehicle internal systems 120, such as e.g. to the instrument cluster of the driving compartment, and possibly also to other systems, such as systems/nodes related to, or being included in the add-on/bodybuilder network 410. The add-on interface 140 may for example be configured for outputting sensor signals adapted for being displayed in any suitable vehicle instrument.

The add-on network 410 may further include an add-on interface configuration tool 414, which may include an external communication unit 161 arranged for communicating with the at least one internal communication unit 116 included in the vehicle. By use of the add-on interface configuration tool 414, the add-on interface 140 may easily be configured and/or defined, as is described in this document. Information related to how the add-on interface 140 is to be configured/defined may be provided based on input to a manufacturer interface entity 420 and/or a client/user interface entity 430 by a manufacturer and/or a client/user. One or more of the manufacturer interface entity 420 and the client/user interface entity 430 may be implemented as an application (APP) program, as an interface portal, as an interface program, or as any suitable equipment arranged for presenting information and/or for receiving input of information.

An add-on/bodybuilder network 410 may be arranged, e.g. in an internet cloud 160 configuration, for communication and/or configuration of the one or more add-on systems 130, and/or for communication with the manufacturer interface entity 420 and/or the client/user interface entity 430. The add-on network 410 may include a communication node 411, which may include an external communication unit 161 arranged for communicating with the at least one internal communication unit 116 included in the vehicle.

Information transmitted to and/or from the vehicle 100 may have one or more features related to one or more configured functions of the add-on interface 140 and/or related to a configured signaling format used for the connection between the at least one internal communication unit 116 and the at least one external communication unit 161. According to some embodiments, an immutable and unique identifier ID may be created based on, and assigned to, the specific configuration of the add-on interface functions and/or of the used signaling.

Generally, the add-on interface configuration tool 414, the manufacturer interface entity 420 and/or the client/user interface entity 430 is normally unaware of the features of the one or more add-on systems 130 and/or of the configuration of the add-on interface 140. Therefore, the add-on interface configuration tool 414, the manufacturer interface entity 420 and/or the client/user interface entity 430 are often also unaware of how to interpret information provided by the one or more add-on systems 130 to them. The immutable and unique identifier ID may therefore be added, e.g. as included in a packet header, to information sent from the one or more add-on systems 130. The information may then be decoded, in a codec 413 connected to the communication node 411, by usage of this immutable and unique identifier ID. The immutable and unique identifier ID may, after having been previously provided by the add-on interface 140 and/or by the add-on interface configuration tool 414, be stored in a register 412 of the add-on network 410. The codec 413 is arranged for encoding and/or decoding information transmitted from and/or to the vehicle 100, e.g. by usage of the immutable and unique identifier ID, which is then provided to the codec 413 by the register 412.

Thus, the codec 413 may detect the immutable and unique identifier ID in a packet header of information transmitted from the vehicle 100, and may therefore be able to determine the specific configuration of the add-on interface 140 and how to detect the information in the packets. Correspondingly, the immutable and unique identifier ID may also be added, e.g. in a packet header, to information transmitted to the vehicle 100. The add-on interface 140 may then, based on the immutable and unique identifier ID, easily identify to which one or more add-on systems 130 and/or one or more vehicle internal systems 120 the information is intended to be transferred.

One or more diagnosis equipment 440 may be arranged in the add-on network 410 to process diagnosis related information. Such one or more diagnosis equipment may for example be included in the manufacturer interface entity 420 and/or in the client/user interface entity 430, or may be implemented in a separate diagnosis equipment 440. The one or more diagnosis equipment 440 is normally unaware of the features of the possibly unknown one or more add-on systems 130 and/or of the configuration of the add-on interface 140. Therefore, in order to provide a generic diagnosis system, diagnostic identifiers are created based on, and assigned to, the specific configuration of the add-on interface 140 and/or the one or more add-on systems 130. By use of these diagnostic identifiers, diagnostic information needed for performing diagnosis may be provided from the vehicle, i.e. from the add-on systems, to the one or more diagnosis equipment 440. Hereby, the diagnosis equipment 440 may be able to provide a reliable diagnosis also for all add-on systems 130, also for the ones being unknown for the diagnosis equipment.

The person skilled in the art will appreciate that a method for facilitating diagnosis for a vehicle according to the present invention may also be implemented in a computer program, which, when it is executed in a computer, instructs the computer to execute the method. The computer may be included in the herein described system and/or may be coupled/connected to the herein described system. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 5:
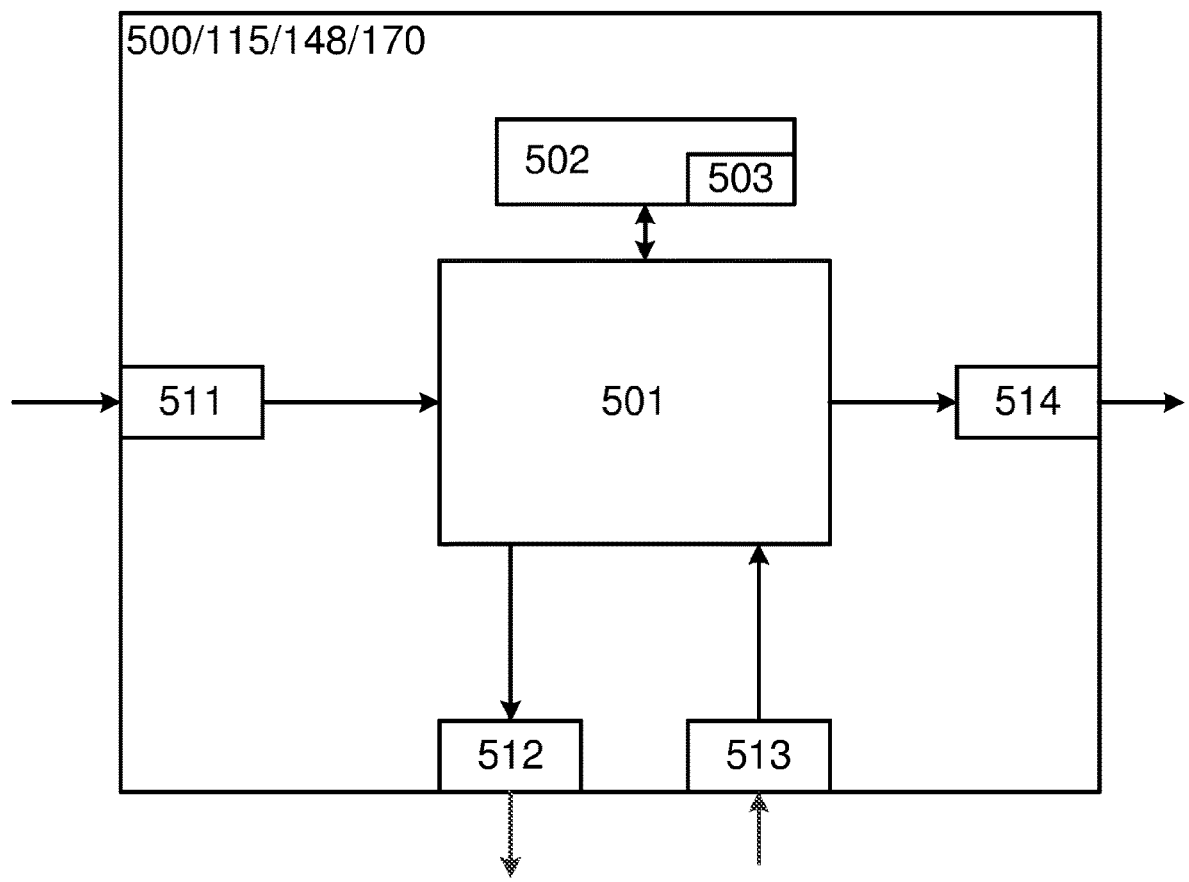
FIG. 5 is a schematic illustration of a control unit according to some embodiments of the present invention.

FIG. 5 shows in schematic representation a control unit/system/means 500/115/148/170. As mentioned above, the vehicle 100 may include one or more control units 115. Also, the add-on interface 140 may be implemented as an interface control unit 148 and the creation and providing of the diagnostic identifiers and/or information may be implemented as an identifier control unit 170. As mentioned below, the identifier control unit 170 may be located/arranged offboard, e.g. in add-on interface configuration tool 414, or in some other offboard unit/device/node. The identifier control unit 170 may also be located/arranged onboard, as illustrated in FIG. 3. The control unit/system/means 500/115/148/170 comprises a computing unit 501, which may be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit/system/means 500/115/148/170, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit/system/means 500/115/148/170 is provided with devices 511, 512, 513, 514 for receiving and transmitting input and output signals. These input and output signals may comprise waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems within or outside the vehicle 100.

Each of the connections to the devices for receiving and transmitting input and output signals can be comprise one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 501 and that the above-stated memory may be constituted by the memory unit 502.

Control systems in modern vehicles commonly comprise communication bus systems including one or more communication buses for linking a number of electronic control units (ECU's), or controllers, and various components located on the vehicle. Such a control system may comprise a large number of control units/means and the responsibility for a specific function can be divided amongst more than one control unit/means. Vehicles of the shown type thus often comprise significantly more control units/means than are shown in FIGS. 1, 3, 4 and 5, which is well known to the person skilled in the art within this technical field.

In the shown embodiment, the present invention is implemented in the control unit/system/means 500/115/148/170. The invention can also, however, be implemented wholly or partially in one or more other control units/systems/means already present in the vehicle, or in some control unit/system/means dedicated to the present invention.

According to an aspect of the invention, at least one control unit, e.g. an interface control unit 148 and an identifier control unit 170, arranged for facilitating diagnosis for a vehicle 100 is presented. The vehicle includes, as mentioned above, at least one vehicle internal system 120, at least one add-on system 130 arranged in the vehicle 100 after the vehicle is produced by a manufacturer, and at least one internal communication unit 116 arranged for communication with at least one vehicle external communication unit 161 outside of the vehicle.

The control unit 148 includes a reception unit/means 141, arranged for receiving 210, by usage of the at least one internal communication unit 116, configuration information related to a configuration of an add-on interface 140 transferred from the at least one vehicle external communication unit 161. The add-on interface 140 is, as mentioned above, arranged in the vehicle 100 as an interface between the at least one vehicle internal system 120 and the at least one add-on system 130.

The control unit 148 further includes a configuration unit/means 142, arranged for configuring 220 the add-on interface 140 based on the received configuration information.

Also, the control unit 170 includes a creation unit/means 171, arranged for creating 230, based on the configuration information, at least one diagnostic identifier related to one or more of the at least one add-on system 130.

The control unit 170 further includes a providing unit/means 172, arranged for providing 240, by use of the at least one internal communication unit 116, the at least one diagnostic identifier to one or more of the at least one vehicle external communication units 161. Hereby, a diagnosis of the one or more of the at least one add-on system performed by at least one diagnosis tool 440 associated with the at least one vehicle external communication units 161 is facilitated/made possible.

By activation of the above described reception unit/means 141, configuration unit/means 142, creation unit/means 171, and providing unit/means 172, a diagnosis of the one or more of the at least one add-on system is provided, which has the above-mentioned advantages.

Here and in this document, units/means are often described as being arranged for performing steps of the method according to the invention. This also includes that the units/means are designed to and/or configured to perform these method steps.

The at least one control unit/system/means 148/170 is in FIG. 1 illustrated as including separately illustrated units/means 141, 142, 171, 172. Also, the control system/means 148/170 may include or be coupled to e.g. other device/means 115. These means/units/devices 141, 142, 171, 172, 148, 170, 115 may, however, be at least to some extent logically separated but implemented in the same physical unit/device. These means/units/devices 141, 142, 171, 172, 148, 170, 115 may also be part of a single logic unit which is implemented in at least two different physical units/devices. These means/units/devices 141, 142, 171, 172, 148, 170, 115 may also be at least to some extent logically separated and implemented in at least two different physical means/units/devices. Further, these means/units/devices 141, 142, 171, 172, 148, 170, 115 may be both logically and physically arranged together, i.e. be part of a single logic unit which is implemented in a single physical means/unit/device. These means/units/devices 141, 142, 171, 172, 148, 170, 115 may for example correspond to groups of instructions, which can be in the form of programming code, that are input into, and are utilized by at least one processor when the units/means are active and/or are utilized for performing its method step, respectively. It should be noted that the control system/means 140 may be implemented at least partly within the vehicle 100 and/or at least partly outside of the vehicle 100, e.g. in a server, computer, processor or the like located separately from the vehicle 100.

As mentioned above, the units 141, 142, 171, 172 described above correspond to the claimed means 141, 142, 171, 172 arranged for performing the embodiments of the present invention, and the present invention as such.

The control system according to the present invention can be arranged for performing all of the above, in the claims, and in the herein described embodiments method steps. The system is hereby provided with the above described advantages for each respective embodiment.

A skilled person also realizes that the above described system may be modified according to the different embodiments of the method of the present invention. The present invention is also related to a vehicle 100, such as a truck, a bus or a car, including the herein described at least one control unit 148, 170 arranged for facilitating diagnosis for a vehicle.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the above described embodiments. Instead, the present invention relates to, and encompasses all different embodiments being included within the scope of the independent claims.

The invention claimed is:

1. A method for facilitating diagnosis for a vehicle, said vehicle comprises: at least one vehicle internal system; at least one add-on system, said add-on system being arranged in said vehicle after said vehicle is produced by a manufacturer; and at least one internal communication unit arranged for communication with at least one vehicle external communication unit, wherein the method comprises:
receiving, via said at least one internal communication unit from said at least one vehicle external communication unit, configuration information related to a configuration of an add-on interface, said add-on interface being arranged in said vehicle as an interface between said at least one vehicle internal system and said at least one add-on system;
configuring said add-on interface based on said configuration information;
creating, based on said configuration information, at least one diagnostic identifier related to one or more of said at least one add-on system; and
providing, by use of said at least one internal communication unit to said at least one vehicle external communication unit, diagnostic information corresponding to said at least one diagnostic identifier to thereby facilitating diagnosis of said at least one add-on system performed by at least one diagnosis tool associated with said at least one vehicle external communication unit.

2. The method as claimed in claim 1, wherein: said configuration information comprises information related to one or more of:
information related to at least one functionality of said add-on interface;

information related to at least one signal used by one or more of said at least one add-on system; or information related to at least one signal used by one or more of said at least one vehicle internal system.

3. The method as claimed in claim 1, wherein at least one signal used by said one or more of said at least one add-on system or by said one or more of said at least one vehicle internal system is one in the group of:
  at least one controller area network signal;
  at least one bus signal;
  at least one digital signal;
  at least one analog signal;
  at least one signal transferred by a wireless connection; or
  at least one signal transferred by a wired connection.

4. The method as claimed in claim 1, wherein said configuring of said add-on interface is performed without involving said manufacturer of said vehicle.

5. The method as claimed in claim 1, wherein said configuration information is received from said at least one vehicle external communication unit via input from one or more of:
  a final user of said vehicle;
  at least one other party not associated with said manufacturer, said at least one other party having knowledge of said at least one add-on system; or
  said manufacturer.

6. The method as claimed in claim 1, wherein said creating of said at least one diagnostic identifier is based also on additional diagnostic information received from one or more of:
  a final user of said vehicle;
  at least one other party not associated with said manufacturer, said at least one other party having knowledge of said at least one add-on system; or
  said manufacturer.

7. The method as claimed in claim 1, wherein said at least one vehicle external communication unit is comprised in or is associated with one or more of:
  a diagnostic tool arranged for performing one or more diagnostic operations on said vehicle using said diagnostic information corresponding to said at least one diagnostic identifier; or
  a register storing one or more of said at least one diagnostic identifier or said diagnostic information.

8. The method as claimed in claim 1, wherein said at least one vehicle external communication unit is comprised in or is associated with one or more of:
  at least one web or internet related unit;
  at least one internet cloud related unit;
  at least one infrastructure unit;
  at least one external communication entity comprised in at least one other vehicle;
  at least one server;
  at least one database;
  at least one processor; or
  at least one computer.

9. The method as claimed in claim 1, wherein said at least one internal communication unit is comprised in a control system network of said vehicle.

10. The method as claimed in claim 9, wherein said at least one add-on system is connected to an external control system network input of a control unit comprising said add-on interface.

11. The method as claimed in claim 1, wherein said at least one internal communication unit is arranged for communicating with said at least one vehicle external communication unit using one or more of:

a wireless communication standard connection; or
a wired connection.

12. The method as claimed in claim 1, wherein said at least one add-on system is a system provided by at least one other party not associated with said manufacturer of said vehicle.

13. A computer program product comprising computer program code stored on a non-transitory computer-readable medium, said computer program product used for facilitating diagnosis for a vehicle, said vehicle comprising: at least one vehicle internal system; at least one add-on system, said add-on system being arranged in said vehicle after said vehicle is produced by a manufacturer; and at least one internal communication unit arranged for communication with at least one vehicle external communication unit, said computer program code comprising computer instructions to cause one or more control units to perform the following operations:
  receiving, via said at least one internal communication unit from said at least one vehicle external communication unit, configuration information related to a configuration of an add-on interface, said add-on interface being arranged in said vehicle as an interface between said at least one vehicle internal system and said at least one add-on system;
  configuring said add-on interface based on said configuration information;
  creating, based on said configuration information, at least one diagnostic identifier related to one or more of said at least one add-on system; and
  providing, by use of said at least one internal communication unit to said at least one vehicle external communication unit, diagnostic information corresponding to said at least one diagnostic identifier to thereby facilitating diagnosis of said at least one add-on system performed by at least one diagnosis tool associated with said at least one vehicle external communication unit.

14. At least one control unit arranged for facilitating diagnosis for a vehicle, said vehicle comprising: at least one vehicle internal system; at least one add-on system, said add-on system being arranged in said vehicle after said vehicle is produced by a manufacturer; and at least one internal communication unit arranged for communication with at least one vehicle external communication unit, wherein said at least one control unit configured for:
  receiving, via said at least one internal communication unit from said at least one vehicle external communication unit, configuration information related to a configuration of an add-on interface, said add-on interface being arranged in said vehicle as an interface between said at least one vehicle internal system and said at least one add-on system;
  configuring said add-on interface based on said configuration information;
  creating, based on said configuration information, at least one diagnostic identifier related to one or more of said at least one add-on system; and
  providing, by use of said at least one internal communication unit to said at least one vehicle external communication unit, diagnostic information corresponding to said at least one diagnostic identifier to thereby facilitating diagnosis of said at least one add-on system performed by at least one diagnosis tool associated with said at least one vehicle external communication unit.

* * * * *